(12) United States Patent
Hamerly et al.

(10) Patent No.: US 6,711,318 B2
(45) Date of Patent: Mar. 23, 2004

(54) OPTICAL SWITCH BASED ON ROTATING VERTICAL MICRO-MIRROR

(75) Inventors: Mike E. Hamerly, Vadnais Heights, MN (US); Robert G. Smith, Vadnais Heights, MN (US); Silva K. Theiss, Woodbury, MN (US); Billy L. Weaver, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 193 days.

(21) Appl. No.: 09/771,757

(22) Filed: Jan. 29, 2001

(65) Prior Publication Data

US 2003/0012487 A1 Jan. 16, 2003

(51) Int. Cl.[7] ................................................. G02B 6/42
(52) U.S. Cl. ............................ 385/18; 385/16; 385/17; 385/15
(58) Field of Search ............................. 385/15, 16, 17, 385/18, 24

(56) References Cited

U.S. PATENT DOCUMENTS

| | | | |
|---|---|---|---|
| 4,954,789 A | 9/1990 | Sampsell | 330/4.3 |
| 4,975,729 A | 12/1990 | Gordon | 355/1 |
| 5,024,500 A | 6/1991 | Stanley et al. | 385/17 X |
| 5,037,173 A | 8/1991 | Sampsell et al. | 385/17 |
| 5,109,459 A | 4/1992 | Eibert et al. | 385/115 |
| 5,208,880 A | 5/1993 | Riza et al. | 385/18 |
| 5,528,710 A | 6/1996 | Burton et al. | 385/16 |
| 5,646,768 A | 7/1997 | Kaeriyama | 359/224 |
| 5,646,928 A | 7/1997 | Wu et al. | 369/122 |
| 5,652,671 A | 7/1997 | Knipe et al. | 359/291 |
| 5,661,611 A | 8/1997 | Kim et al. | 359/871 |
| 5,745,271 A | 4/1998 | Ford et al. | 359/130 |
| 5,748,811 A | 5/1998 | Amersfoort et al. | 385/15 |
| 5,768,006 A | 6/1998 | Min et al. | 359/290 |
| 5,774,604 A | 6/1998 | McDonald | 385/18 |
| 5,786,915 A | 7/1998 | Scobey | 359/127 |

(List continued on next page.)

FOREIGN PATENT DOCUMENTS

| | | | | |
|---|---|---|---|---|
| DE | 41 00 358 A1 | 7/1992 | | 385/15 X |
| DE | 19500214 A | 2/2001 | | 385/15 X |
| EP | 0 569 187 A1 | 11/1993 | | 385/16 X |

(List continued on next page.)

OTHER PUBLICATIONS

Takeuchi et al., "Niobium Superconducting Quarter–Wave Resonators as a Heavy Ion Accelerating Structure", 2107a Nuclear Instruments & Methods in Physics Research, A281(1989)Sep. 15, No. 3, Amsterdam, NL, pp. 428–432.
Reid et al., "A Surface Micromachined Rotating Micro–Mirror Normal to the Substrate", IEEE Conference on Optical MEMS, pp. 39–40 (1996).

(List continued on next page.)

Primary Examiner—Brian Healy
(74) Attorney, Agent, or Firm—Bradford B. Wright

(57) ABSTRACT

A MEMS-based device to steer and manipulate beams of light traveling in free-space in an optical switch. The optical switch is based on a rotating vertical micro-mirror constructed on a surface of a substrate. At least one input optical fiber is arranged to direct at least one optical signal through free-space along a first optical path parallel to the surface of the substrate. A plurality of output optical fibers are arranged to receive the optical signal traveling through free-space along other optical paths not co-linear with the first optical path. At least one substantially vertical, rotating micro-mirror assembly is constructed on the substrate. The assembly includes a rotating micro-mirror with a vertical centerline and an axis of rotation both perpendicular to the surface, but not co-linear. The rotating micro-mirror is rotatable between a first position not in the first optical path and at least a second position redirecting the optical signal to one of the output optical fibers.

15 Claims, 6 Drawing Sheets

U.S. PATENT DOCUMENTS

| | | | |
|---|---|---|---|
| 5,805,331 A | 9/1998 | Lee | 259/295 |
| 5,818,623 A | 10/1998 | Valette et al. | 359/224 |
| 5,862,003 A | 1/1999 | Saif et al. | 359/871 |
| 5,872,880 A | 2/1999 | Maynard | 385/88 |
| 5,877,889 A | 3/1999 | Um et al. | 385/295 |
| 5,878,177 A | 3/1999 | Karasan et al. | 385/17 |
| 5,886,811 A | 3/1999 | Min | 385/291 |
| 5,900,998 A | 5/1999 | Kim et al. | 359/871 |
| 5,903,383 A | 5/1999 | Bernstein et al. | 359/298 |
| 5,903,687 A * | 5/1999 | Young et al. | 385/17 |
| 5,914,801 A | 6/1999 | Dhuler et al. | 359/230 |
| 5,914,803 A | 6/1999 | Hwang et al. | 359/291 |
| 5,923,798 A | 7/1999 | Aksyuk et al. | 385/19 |
| 5,936,757 A | 8/1999 | Kim et al. | 359/224 |
| 5,943,158 A | 8/1999 | Ford et al. | 354/295 |
| 5,959,376 A | 9/1999 | Allen | 310/40 MM |
| 5,959,749 A | 9/1999 | Danagher et al. | 359/124 |
| 5,960,132 A | 9/1999 | Lin | 385/18 |
| 5,960,133 A | 9/1999 | Tomlinson | 385/18 |
| 5,962,949 A | 10/1999 | Dhuler et al. | 310/307 |
| 5,963,367 A | 10/1999 | Aksyuk et al. | 359/292 |
| 5,966,230 A | 10/1999 | Swartz et al. | 359/196 |
| 5,974,207 A | 10/1999 | Aksyuk et al. | 385/24 |
| 5,982,554 A | 11/1999 | Goldstein et al. | 359/629 |
| 5,994,159 A | 11/1999 | Aksyuk et al. | 438/52 |
| 5,995,688 A | 11/1999 | Aksyuk et al. | 385/14 |
| 6,014,240 A | 1/2000 | Floyd et al. | 359/201 |
| 6,016,217 A | 1/2000 | Dötzel et al. | 359/292 |
| 6,020,272 A | 2/2000 | Fleming | 438/734 |
| 6,028,689 A | 2/2000 | Michalicek et al. | 359/224 |
| 6,031,946 A | 2/2000 | Bergmann et al. | 385/18 |
| 6,035,080 A | 3/2000 | Henry et al. | 385/24 |
| 6,044,056 A | 3/2000 | Wilde et al. | 369/119 |
| 6,044,705 A | 4/2000 | Neukermans et al. | 73/504.02 |
| 6,046,840 A | 4/2000 | Huibers | 339/291 |
| 6,091,867 A * | 7/2000 | Young et al. | 349/197 |
| 6,164,837 A | 12/2000 | Haake et al. | 385/90 |
| 6,243,507 B1 * | 6/2001 | Goldstein et al. | 385/13 |
| 6,253,001 B1 * | 6/2001 | Hoen | 385/16 |
| 6,275,325 B1 | 8/2001 | Sinclair | 359/291 |
| 6,301,403 B1 * | 10/2001 | Heanue et al. | 310/309 |
| 6,483,957 B1 | 11/2002 | Hamerly et al. | 385/17 |
| 6,531,947 B1 | 3/2003 | Weaver et al. | 337/139 |
| 2002/0195674 A1 | 12/2002 | Weaver et al. | 385/18 X |

FOREIGN PATENT DOCUMENTS

| | | | |
|---|---|---|---|
| EP | 0 672 931 A1 | 9/1995 | 385/16 X |
| EP | 0 713 117 A1 | 5/1996 | 385/16 X |
| EP | 0 762 161 A1 | 3/1997 | 385/15 X |
| EP | 0 783 124 A1 | 7/1997 | 385/1 X |
| EP | 0 794 558 A1 | 9/1997 | 385/1 X |
| EP | 0 771 121 A2 | 10/1997 | 385/901 X |
| EP | 0 902 538 A2 | 3/1999 | 385/16 X |
| EP | 0 911 659 A1 | 4/1999 | 385/16 X |
| EP | 0 932 066 A1 | 7/1999 | 385/18 X |
| EP | 0 961 150 A2 | 12/1999 | 385/18 X |
| EP | 0 962 796 A2 | 12/1999 | 385/18 X |
| JP | 57011302 | 1/1982 | 385/17 X |
| WO | 96/07945 | 3/1996 | 385/15 X |
| WO | 96/07952 A1 | 3/1996 | 385/37 X |
| WO | 96/08059 | 3/1996 | 385/37 X |
| WO | 96/18131 | 6/1996 | 385/18 X |
| WO | 97/06617 | 2/1997 | 385/24 X |
| WO | 98/07060 | 2/1998 | 385/15 X |
| WO | 98/35258 | 8/1998 | 385/17 X |
| WO | 99/38348 | 7/1999 | 385/17 X |
| WO | 00/13210 | 3/2000 | 385/17 X |
| WO | 00/14415 | 3/2000 | 385/15 X |
| WO | 00/25160 | 5/2000 | 385/18 X |
| WO | 00/52835 | 9/2000 | 385/18 X |
| WO | 00/75710 A2 | 12/2000 | 385/18 X |
| WO | WO 00/79311 A2 | 12/2000 | 385/17 X |
| WO | 01/09653 A1 | 2/2001 | 385/15 X |

OTHER PUBLICATIONS

Comtois et al., "Applications for Surface–Micromachined Polysilicon Thermal Actuators and Arrays", 58 Sensors and Actuators 19–25 (1997).

Lih et al., "Micromachined Free–Space Matrix Switches with Submillisecond Switching Time for Large–Scale Optical Crossconnect", Optical Fiber Communication Conference, pp. 147–148 (1998).

Behin et al., "Magnetically Actuated Micromirrors for Fiber–Optic Switching", Solid State Sensor and Actuator Workshop pp. 273–276 (1998).

Butler et al., "Scanning and Rotating Micromirrors Using Thermal Actuators", 3131 SPIE 134–144 (1997).

Fouquet et al., "Compact, Scalable Fiber Optic Cross–Connect Switches", IEEE WDM Components Conference, pp. 59–60 (1999).

Herzel Laor, "Construction and Performance of a 576×576 Single–Stage OXC", IEEE Lasers and Electro–Optics Society, pp. 481–482 (1999).

Goldstein et al., "Optical–Mems–Based Tail–End Switching for Restoration of Line–Rate Services", AT&T Labs–Research.

Chiou et al., "A Micromirror Device with Tilt and Piston Motions", 3893 SPIE 298–303 (1999).

Sumriddetchkajom et al., "Micromachine–based Fault–Tolerant High Resolution High–Speed Programmable Fiber–Optic Attenuator", ThQ1–1 University of Central Florida 240–242.

Aksyuk et al., "Stress–induced Curvature Engineering in Surface–Micromachined Devices", 3680 SPIE 984–993 (1999).

Zou et al., "Optical Properties of Surface Micromachined Mirrors with Etch Holes", 8 Journal of Microelectromechanical systems 506–513 (1999).

Koester et al., "MUMPS Design Handbook, Revision 5.0", Cronos Integrated Microsystems (2000).

Mossman et al., "New Reflective Display Based on Total Internal Reflection in Prismatic Microstructures".

Lin et al., "Lightwave Micromachines for Optical Crossconnects".

Zou et al., "Optical Properties of Surface Micromachined Mirrors with Etch Holes", 8 Journal of Microelectrical Systems 506–513 (1999) (Abstract).

Kopka et al., "Coupled U–Shaped Cantilever Actuators for 1×4 and 2×2 Optical Fibre Switches", 10 J. Micromech. Microeng. 260–264 (2000).

Reid et al., "Automated Assembly of Flip–Up Micromirrors", 66 Sensors and Actuators 292–298 (1998).

Riza et al., "Digitally Controlled Fault–Tolerant Multiwavelength Programmable Fiber–Optic Attenuator Using a Two–Dimensional Digital Micromirror Device", 24 Optics Letters 282–284 (1999).

Kolesar et al., "Implementation of Micromirror Arrays as Optical Binary Switches and Amplitude Modulators", 332 Thin Solid Films 1–9 (1998).

R. Syms, "Operation of surface–tension Self–Assembled 3D Micro–Optomechanical Torsion Mirror Scanner", 35 Electronics Letters 1157–1158 (1999).

Lin et al., "High–Density Micromachined Polygon Optical Crossconnects Exploiting Network Connection–Symmetry", 10 IEEE Photonics Technology Letters 1425–1427 (1998).

Lee et al., "Free–Space Fiber–Optic Switches Based on MEMS Vertical Torsion Mirrors", 17 Journal of Lightwave Technology 7–13 (1999).

Yasseen et al., "A Rotary Electrostatic Micromotor 1×8 Optical Switch", 5 IEEE Journal of Selected Topics in Quantum Electronics 26–32 (1999).

Toshiyoshi et al., "Electromagnetic Torsion Mirrors for Self–Aligned Fiber–Optic Crossconnectors by Silicon Micromachining", 5 IEEE Journal of Selected Topics in Quantum Electronics 10–17 (1999).

Ford et al., "Wavelength Add–Drop Switching Using Tilting Micromirrors", 17 Journal of Lightwave Technology 904–911 (1999).

Aksyuk et al., "Low Insertion Loss Packaged and Fiber–Connectorized SI Surface–Micromachined Reflective Optical Switch", Solid State Sensor and Actuator Workshop pp. 79–82 (1998).

* cited by examiner-

OPTICAL SWITCH BASED ON ROTATING VERTICAL MICRO-MIRROR

FIELD OF THE INVENTION

The present invention relates to an optical switch based on a rotating vertical micro-mirror positioned off-set from its axis of rotation, and in particular, to a method and apparatus for using a MEMS-based device to steer and manipulate beams of light traveling in free-space in an optical switch.

BACKGROUND OF THE INVENTION

Fiber optics technology is revolutionizing the telecommunications field. Optical switches can be used to turn the light output of an optical fiber on or off, or, alternatively, to redirect the light to various different fibers, all under electronic control. Such switches can be used in a variety of different applications, including, for example, devices such as add-drop multiplexers in wavelength-division-multiplexing systems, reconfigurable networks, hot backups to vulnerable components, and the like. In those and other applications, it would be useful to have optical switches characterized by moderate speed, low insertion loss, high contrast ratio and low manufacturing cost.

Known optical switches may be categorized generally as belonging to one of two classes. One class may be referred to as bulk opto-mechanical switches. In such switches, an input fiber, typically engaged to a lens, is physically translatable from a first position to at least a second position. In each position, the input fiber optically connects with a different output fiber. Bulk opto-mechanical switches possess several desirable characteristics, including low cost, low insertion loss, low back-reflection, and insensitivity to polarization. Unfortunately, such opto-mechanical switches are slow, having response times within the range of 0.1 to 10 seconds.

A second type of optical switch may be referred to as an integrated-optical switch. In such switches, an input fiber is coupled to a planar waveguide, typically lithium niobate or silicon. Output fibers are connected to various output ports of the waveguide. The electro-optic effect, whereby application of a voltage to the waveguide changes the refractive index of the various regions of the waveguide, is used to change the route of an optical signal traveling through the planar waveguide. In this manner, an input signal can be switched to one of a variety of output fibers. While such switches are very fast, they are quite expensive and frequently polarization sensitive.

As such, there is a need for a low cost optical switch possessing the desirable characteristics of opto-mechanical switches, but having a much greater switching speed.

BRIEF SUMMARY OF THE INVENTION

The present invention is directed to a MEMS-based device that steers and manipulates beams of light traveling in free-space in an optical switch.

The optical switch is based on one or more rotating vertical micro-mirrors constructed on a surface of a substrate. At least one input optical fiber is arranged to direct at least one optical signal through free-space generally over the surface of the substrate. A plurality of output optical fibers are arranged to receive the optical signal traveling through the free-space. In some embodiments, the output optical fibers are arranged along optical paths that are not co-linear with the first optical path. At least one substantially vertical, rotating micro-mirror assembly is located on the substrate in the free-space. The assembly includes a rotating micro-mirror with a vertical centerline and an axis of rotation both perpendicular to the surface, but not co-linear. The rotating micro-mirror is rotatable between a first position not in the first optical path and at least a second position in the first optical path. The rotating micro-mirror redirects the optical signal to one of the output optical fibers when in the second position.

The optical switch can include a plurality of input optical fibers. The input optical fibers are optionally arranged perpendicular to each of the output optical fibers. In one embodiment, the optical switch includes a plurality of output optical fibers generally arranged around the rotating micro-mirror assembly. In this embodiment, the second position of the micro-mirror comprises a plurality of positions each adapted to direct the optical signal to one of the output optical fibers.

In another embodiment, the optical switch includes a plurality of output optical fibers generally arranged perpendicular to the input optical fiber with a rotating micro-mirror assembly adjacent to the first optical path, but opposite each of the output optical fibers to selectively redirect the optical signal to any of the output optical fibers.

In yet another embodiment, the optical switch includes a plurality of input optical fibers each arranged to direct a discrete optical signal through the free-space. An array of rotating micro-mirror assemblies are constructed on the substrate and arranged to direct the discrete optical signals from any of the plurality of input optical fibers to any of the output optical fibers. The optical switch may optionally include a secondary array of output optical fibers arranged to receive the optical signals from one or more of the input optical fibers when the rotating micro-mirrors are in the first position. Each optical fiber in the secondary array is typically co-linear with one of the input optical fibers.

In one embodiment, the rotating micro-mirror rotates about 45 degrees between a first position and the second position. In another embodiment, the rotating micro-mirror rotates about 135 degrees between a first position and the second position.

In another embodiment, there is a gap between the axis of rotation and the rotating micro-mirror. The optical signal can pass through the gap without engaging the micro-mirror when the micro-mirror is in the first position. The rotating micro-mirror assembly may be mechanically coupled to a plurality of thermal actuators.

The present invention is also directed to an optical communication system including at least one optical switch in accordance with the present invention.

BRIEF DESCRIPTION OF THE SEVERAL VIEWS OF THE DRAWINGS

Further features of the invention will become more apparent from the following detailed description of specific embodiments thereof when read in conjunction with the accompany drawings.

DETAILED DESCRIPTION OF THE INVENTION

Figure 1:
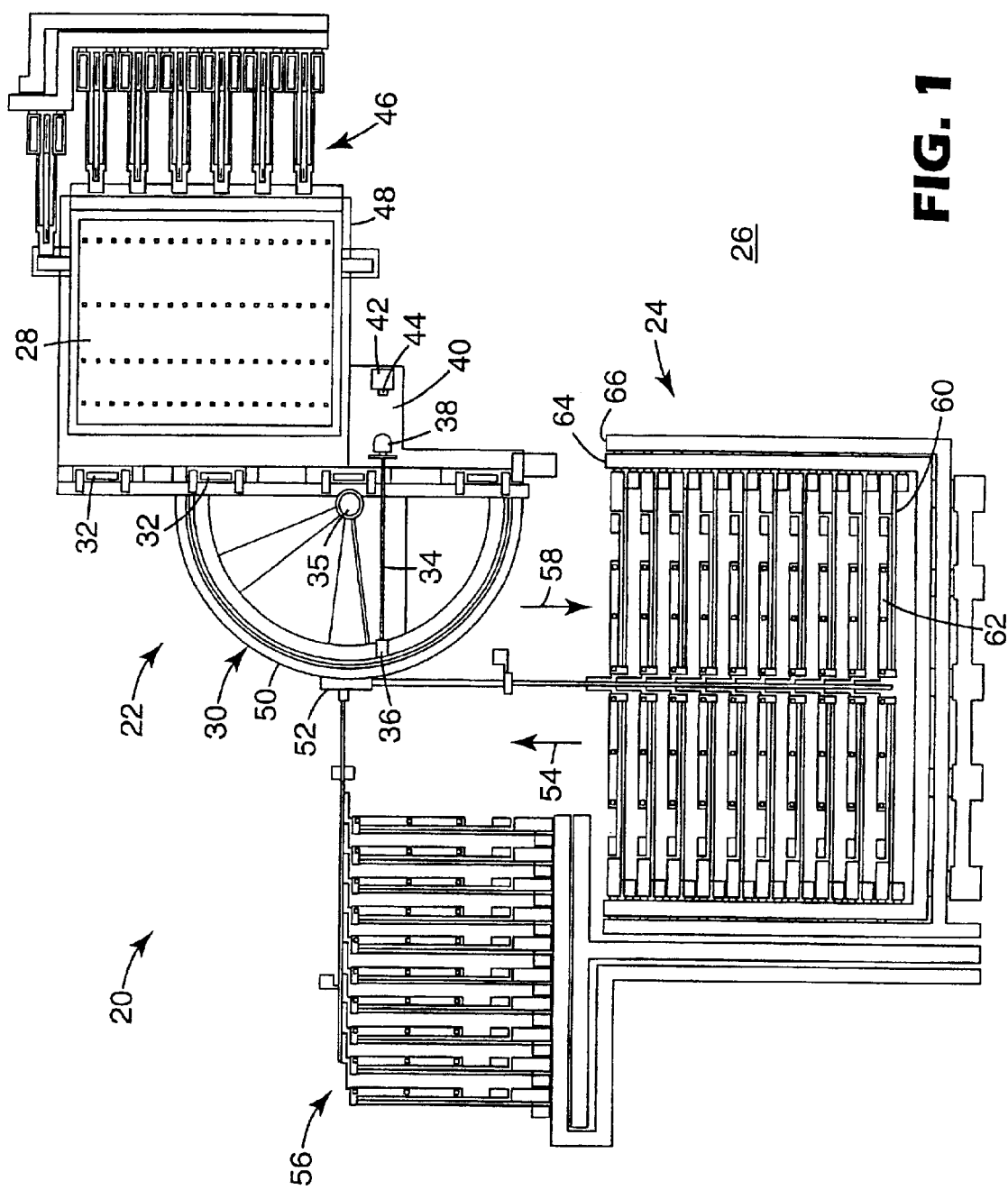
FIG. 1 is a top view of an exemplary rotating micro-mirror in accordance with the present invention.

The present invention is directed to an optical switch based on a micro-mechanical device including one or more rotating vertical micro-mirrors positioned offset or off-center from the axis of rotation. A MEMS-based rotating micro-mirror steers and manipulates beams of light traveling in free-space over the substrate in the optical switch. The rotating micro-mirror is capable of repeatable and rapid movement to steer and manipulate beams of light in an optical switch.

As used herein, "micro-mechanical device" refers to micrometer-sized mechanical, opto-mechanical, electro-mechanical, or opto-electro-mechanical device constructed on the surface of a substrate. "Offset" or "off-center" refers to the axis of rotation not being co-linear with a vertical centerline of the mirror. "Free-space" refers to the region traveled by the optical signal outside of an optical conduit. Although the free-space is typically above the substrate, a portion may be off of the substrate. For example, the free-space can be the region where the optical signal travels after exiting an input optical fiber and before entering an output optical fiber.

Various technologies for fabricating micro-mechanical devices are available, such as for example the Multi-User MEMS Processes (MUMPs) from Cronos Integrated Microsystems located at Research Triangle Park, North Carolina. One description of the assembly procedure is described in "MUMPs Design Handbook," revision 5.0 (2000) available from Cronos Integrated Microsystems.

Polysilicon surface micromachining adapts planar fabrication process steps known to the integrated circuit (IC) industry to manufacture micro-electro-mechanical or micro-mechanical devices. The standard building-block processes for polysilicon surface micromachining are deposition and photolithographic patterning of alternate layers of low-stress polycrystalline silicon (also referred to a polysilicon) and a sacrificial material (e.g. silicon dioxide or a silicate glass). Vias etched through the sacrificial layers at predetermined locations provide anchor points to a substrate and mechanical and electrical interconnections between the polysilicon layers. Functional elements of the device are built up layer by layer using a series of deposition and patterning process steps. After the device structure is completed, it can be released for movement by removing the sacrificial material using a selective etchant such as hydrofluoric acid (HF) which does not substantially attack the polysilicon layers.

The result is a construction system generally consisting of a first layer of polysilicon which provides electrical interconnections and/or a voltage reference plane, and additional layers of mechanical polysilicon which can be used to form functional elements ranging from simple cantilevered beams to complex electro-mechanical systems. The entire structure is located in-plane with respect to the substrate. As used herein, the term "in-plane" refers to a configuration generally parallel to the surface of the substrate. After manufacturing, the micro-mirrors are raised to an out-of-plane configuration. As used herein, the terms "out-of-plane" refer to a configuration greater than zero degrees to about ninety degrees relative to the surface of the substrate. In an embodiment where the light beams travel parallel to the surface of the substrate, the micro-mirrors are generally perpendicular to the substrate.

Since the entire process is based on standard IC fabrication technology, a large number of fully assembled devices can be batch-fabricated on a silicon substrate without any need for piece-part assembly. The present micro-mechanical devices can be packaged using conventional IC packaging techniques. In those embodiments that are packaged, the free-space is substantially contained within the package. The package containing the micro-mechanical device and/or the free-space can optionally be a vacuum or can be filled with nitrogen, argon or a variety of other gases.

FIG. 1 is a top view of a micro-mechanical device 20 including a rotating mirror assembly 22 and an array of thermal actuators 24 constructed on a surface of a substrate 26. The rotating mirror assembly 22 includes a mirror 28 attached to a rotating base 30 by one or more hinges 32. The rotating base 30 is attached to the surface of the substrate 26 by a pivot 35 that permits the mirror 28 and the base 30 to rotate. Latch arm 34 is attached to the rotating base 30 at first end 36. Free end 38 rests on portion 40 attached to the mirror 28.

The rotating mirror assembly 22 is formed in-plane on the surface of the substrate 26. After fabrication is completed, the mirror 28 is lifted out-of-plane. In the preferred embodiment, the mirror 28 is raised to a substantially vertical position relative to the surface of the substrate 26 (see FIGS. 2–5). As the mirror 28 is raised, free end 38 of the latch arm 34 slides along the surface 40 until it engages with latch hole 42. The latch hole 42 preferably includes a notch 44 that engages with free end 38 of the latch arm 34. Once engaged, the latch arm 34 retains the mirror 28 in the upright position. In an embodiment where an optical signal travels parallel to the surface of the substrate 26, the mirror 28 is generally perpendicular (vertical) to the substrate 26.

The mirror 28 can be raised manually or by a series of actuators. In the illustrated embodiment, an array of thermal actuators 46 is positioned to raise the mirror 28 off the surface of the substrate 26. Once in the partially raised configuration, the mirror 28 can be manually raised to the upright position.

Mirror 28 is attached to rotating base 30 off center. In the illustrated embodiment, edge 48 of the mirror 28 is generally aligned with pivot 35. The rotating base 30 includes a toothed edge 50 that intermittently engages with a toothed member 52. In order to rotate the mirror 28 in the clockwise direction, thermal actuators 56 are activated to bias the toothed member 52 against the toothed edge 50 of the rotating base 30. The array of thermal actuators 24 are then activated so as to displace the toothed member 52 in the direction 54. The thermal actuators 56 are then deactivated to disengage the toothed member 52 from the rotating base 30. The thermal actuators 24 are then deactivated so that the toothed member 52 moves in the direction 58. The array 56 is then activated to reengage the toothed member 52 with the rotating base 30 and the process of activating the array 24 is repeated.

To rotate the mirror 28 in the counter-clockwise direction, the above noted process is reversed. The array 24 is activated without the toothed member 52 being biased against the rotating base 30. Once the toothed member 52 is displaced in the direction 54, the array 56 is activated to bias the toothed member 52 to the toothed edge 50. The array 24 is then deactivated so that the toothed member 52 is pulled in the direction 58.

Other rotating micro-mirror designs are disclosed in a commonly assigned U.S. patent application Ser. No. 09/771,765 entitled "MEMS Based Polarization Mode Dispersion Compensator", filed Jan. 29, 2001, and Butler et al., "Scanning and Rotating Micromirrors Using Thermal Actuators", 3131 SPIE 134–144 (1997).

The array of thermal actuators 24 is configured to provide displacement in a direction 54 generally parallel to the surface of the substrate 26. In particular, each of the thermal actuators includes a hot arm 60 and a cold arm 62. When current is applied to the hot and cold arms 60, 62 through the traces 64, 66, the hot arm 60 thermally expands to a greater extent than the cold arm 62. Consequently, when current is applied to the array of thermal actuators 24, the toothed member 52 is displaced in the direction 54. When current is removed from the array of thermal actuators 24, the toothed member 52 moves in the direction 58, back to its original unactivated position.

Various thermal actuator structures can be used in the present invention, such as disclosed in commonly assigned U.S. patent applications entitled "Direct Acting Vertical Thermal Actuator", filed Sep. 12, 2000, Ser. No. 09/659,572 and "Direct Acting Vertical Thermal Actuator with Controlled Bending", filed Sep. 12, 2000, Ser. No. 09/659,798.

Figure 2:
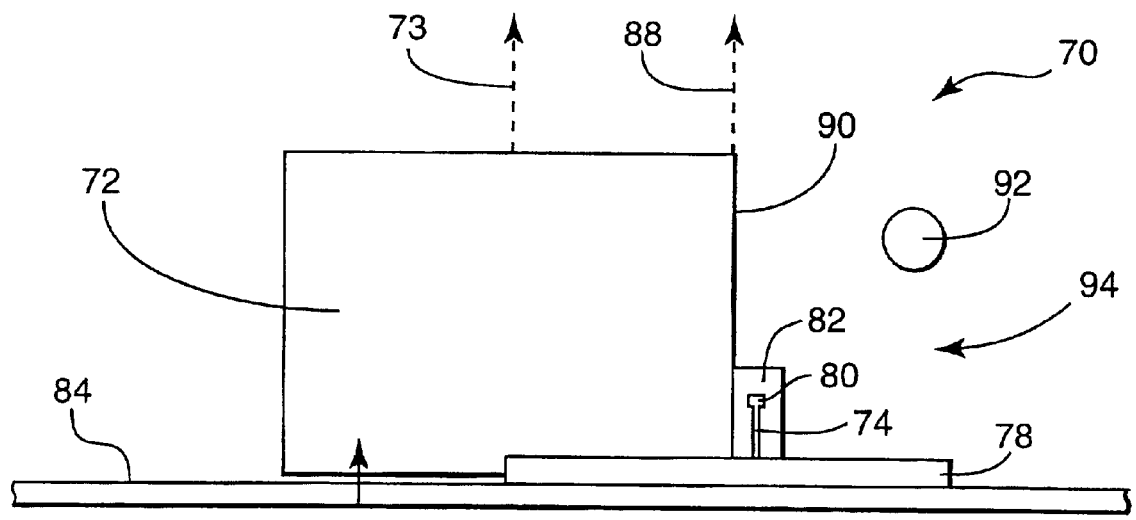
FIG. 2 is a front schematic view of a rotating micro-mirror in accordance with the present invention.
Figure 3:
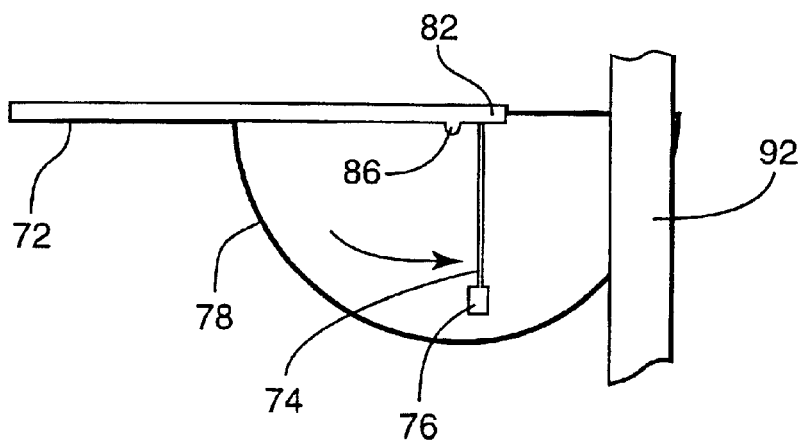
FIG. 3 is a top schematic view of the rotating micro-mirror of FIG. 2.

FIGS. 2 and 3 are schematic illustrations of a rotating micro-mirror assembly 70 in a substantially vertical configuration in accordance with the present invention. Micromirror 72 is held in a vertical configuration by latch arm 74 that is attached at a first end 76 to a rotating base 78 and at second end 80 to member 82 that is part of the micro-mirror 72.

Vertical centerline 73 on the micro-mirror 72 is offset from axis of rotation 88, both of which are normal to the surface of the substrate 84. The rotating micro-mirror assembly 70 rotates on a surface of the substrate 84 around a pivot 86. Although the embodiment of FIGS. 2 and 3 illustrates edge 90 of the micro-mirror 72 generally co-linear with the axis of rotation 88, it is possible for the edge 90 to be located on either side of the axis 88. That is, the degree of offset of the mirror 72 relative to the rotating base 78 can be modified for specific application (see FIGS. 4 and 5).

Figure 7:
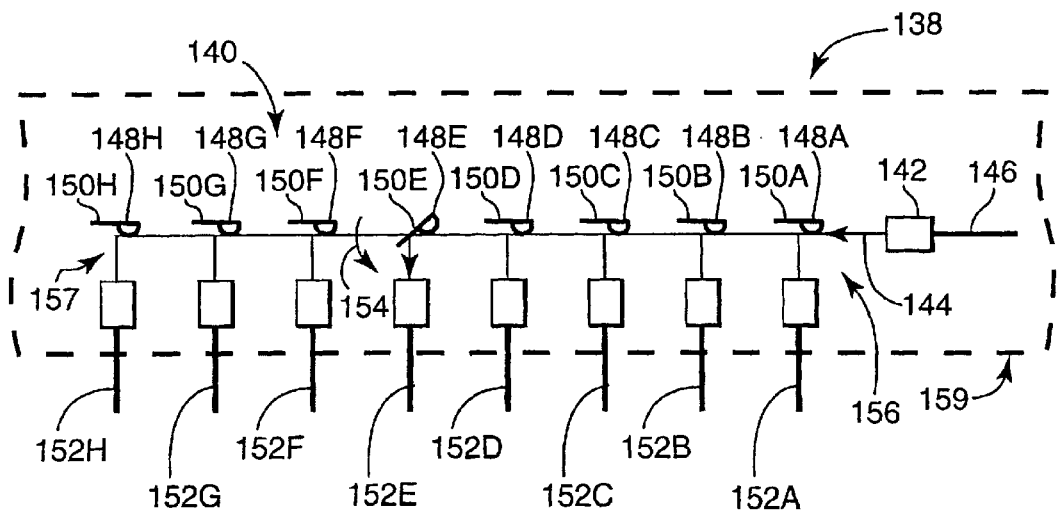
FIG. 7 is a schematic illustration of an alternate 1×N optical switch in accordance with the present invention.

One advantage of the offset configuration of the micromirror 72 of FIGS. 2 and 3 is that an optical signal 92 can be directed in free-space 94 over the substrate 84 adjacent to the axis 88 without engaging the mirror 72 (see FIG. 7). In the illustrated embodiment, the optical signal 92 is directed parallel to the surface of the substrate 84. The mirror 72 can also be rotated in either direction until it engages the optical signal 92 and redirects it in a second direction. In one embodiment, the mirror 72 is rotated about 135 degrees so that the optical signal 92 is redirected generally perpendicular to its original path.

Figure 4:
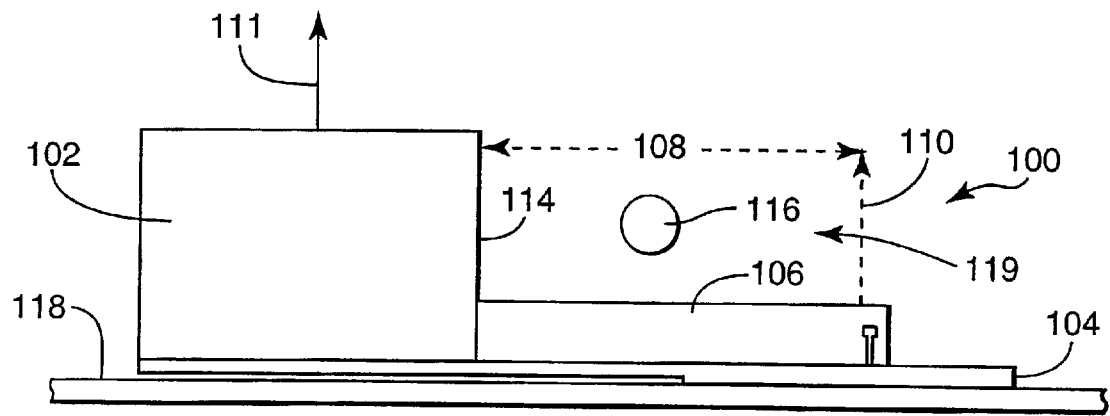
FIG. 4 is a front schematic view of an alternate rotating micro-mirror in accordance with the present invention.
Figure 5:
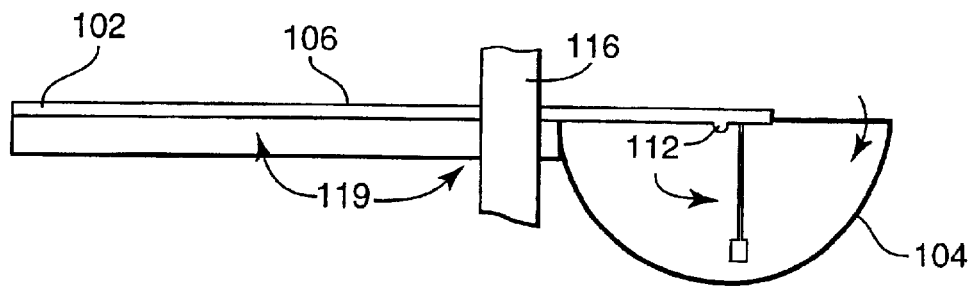
FIG. 5 is a top schematic view of the rotating micro-mirror of FIG. 4.

FIGS. 4 and 5 illustrate an alternate rotating micro-mirror assembly 100 in which the micro-mirror 102 is offset from the rotating base 104 by an extension arm 106. The extension arm 106 creates a gap 108 between the axis of rotation 110 extending through pivot 112 and an inside edge 114 of the micro mirror 102. The gap 108 is smaller than the distance between the axis of rotation 110 and vertical centerline 111 of the micro-mirror 102. Depending on the position of the micro-mirror 102, an optical signal 116 can theoretically be directed through the gap 108 without contacting the micro-mirror 102. In an alternate configuration, the micro-mirror 102 can be positioned to deflect the optical signal 116 in another direction (see FIG. 9).

In the illustrate embodiment, the optical signal 116 is directed parallel to the surface of the substrate 118 through free-space 119. Since the optical signal 116 is directed through the gap 108 between the axis 110 and the edge 114, the mirror 102 can engage the optical signal if rotated less than 45 degrees. In the illustrated embodiment, the optical signal 116 can be diverted by about 90 degrees if the mirror 102 is rotated about 45 degrees (see FIG. 8).

Figure 6:
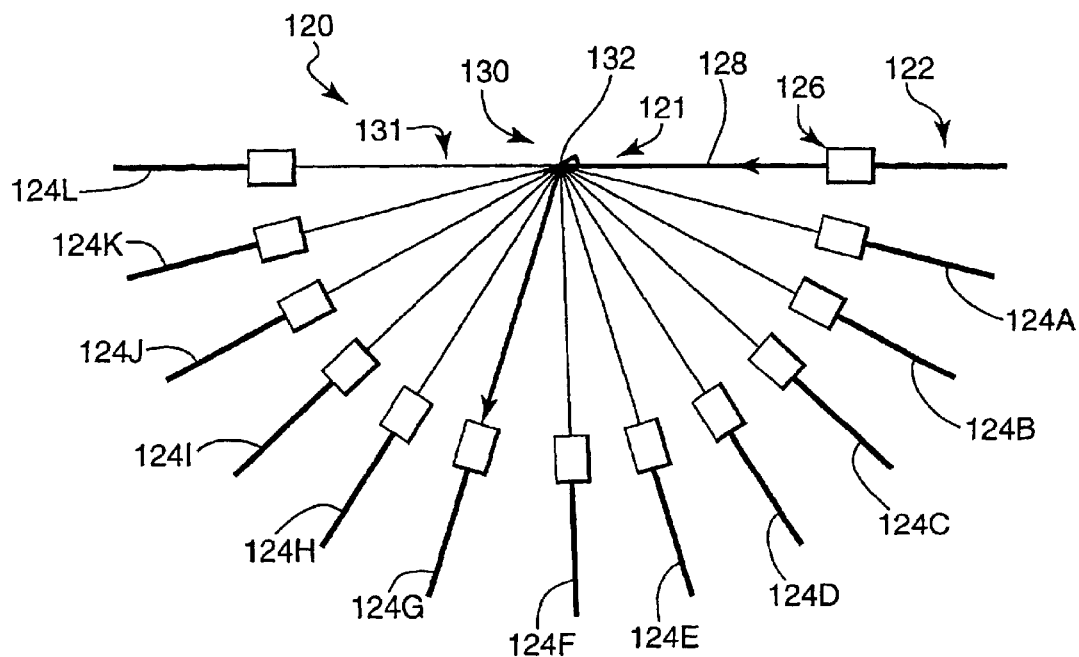
FIG. 6 is a schematic illustration is a 1×N optical switch in accordance with the present invention.

FIG. 6 is schematic illustration of an optical communication system 120 including an 1×N optical switch 121 in accordance with the present invention. The "1" in the designation 1×N refers to a single input fiber 122 and the "N" refers to multiple output fibers 124A–124L (referred to collectively as "124"). The embodiment of FIG. 6 can also be used as a N×1 switch with multiple input fibers 124 and a single output fiber 122.

A collimating lens 126 directs optical signal 128 through free-space 131 to a rotating mirror assembly 130. In the embodiment of FIG. 6, free-space 131 is the region traversed by the optical signal 128 over the substrate (see FIG. 2) between the collimating lens 126 and one of the output optical fibers 124.

The mirror 132 can be positioned to direct the optical signal 128 to any of the output fibers 124. In the illustrated embodiment, the mirror 132 is positioned to reflect the optical signal 128 to the output fiber 124G. In another embodiment, the mirror 132 can be rotated out of position so that it does not engage the optical signal 128. In this alternate embodiment, the optical signal 128 simply moves through free-space 131 from input fiber 122 to output fiber 124L.

FIG. 7 is schematic illustration of an optical communication system 138 including an alternate 1×N optical switch 140 in accordance with the present invention. Collimating lens 142 directs optical signal 144 from optical fiber 146 through free-space 156 along an optical path 157 over substrate 159 adjacent to a plurality of rotating micromirrors 148A–148H (collectively "148"). Because the mirrors 150A–150H (collectively "150") are offset from the optical path 157, the optical signal 144 passes adjacent to, but does not contact any of the mirrors 150. By rotating one of the micro-mirrors 148 about 45 degrees, the optical signal 144 can be directed to any of a plurality of output fibers 152A–152H (collectively "152"). The free-space 156 is the region between the collimating lens 142 and any of the output fibers 152. In the illustrated embodiment, the rotating micro-mirror 148E is rotated 45 degrees in a direction 154 so as to direct the optical signal 144 to the output optical fiber 152E.

Figure 8:
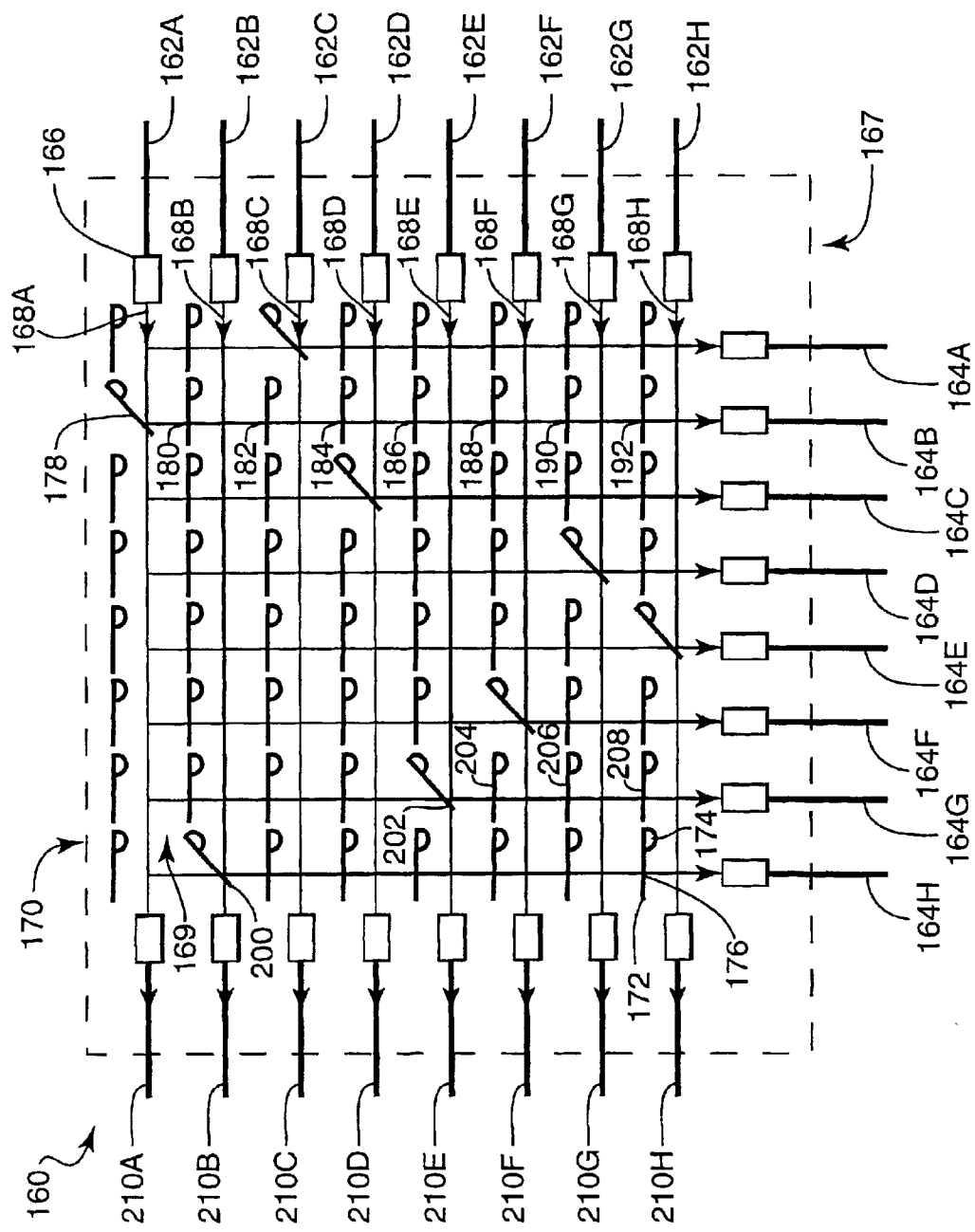
FIG. 8 is a schematic illustration of an N×N optical switch in accordance with the present invention.

FIG. 8 is schematic illustration of an N×N optical switch 160 in accordance with the present invention. The first "N" refers to a plurality of input fibers 162A–162H (collectively "162") and the second "N" refers to a plurality of output fibers 164A–164H (collectively "164"). Each of the input fibers 162 includes a collimating lens 166 for directing a plurality of optical signals 168A–168H (collectively "168") from each of the input fibers 162A–162H, respectively, to any of the plurality of output fibers 164A–164H (collectively "164").

The optical signals 168 are directed into a free-space 169 over substrate 167 containing an array of rotating micromirrors 170, generally as illustrated in FIGS. 4 and 5. The rotating mirrors 170 are preferably constructed on a single substrate 167. Each of the rotating mirrors 170 includes a mirror 172 offset from an axis of rotation 174 by an extension 176. Consequently, when any of the rotating mirrors 172 in the array of micro-mirrors 170 is in a neutral position, an optical signal 168 can pass over the extension 176 without engaging the mirror 172. As used herein, "neutral position" refers to a configuration of a rotating micro-mirror where the mirror does not engage with optical signal 168.

For example, the signal 168A is diverted by mirror 178 towards the output optical fiber 164B. After reflecting off the mirror 178, the signal 168A passes over a plurality of extensions 180, 182, 184, 186, 188, 190, 192 of the respective micro-mirrors from the array 170 without engaging the corresponding mirror attached to each of those extensions (see FIGS. 4 and 5).

In operation, the optical signals 168 can be directed to any of the output optical fibers 164, without interfering with each other. For example, optical signal 168B is reflected off micro-mirror 200 and is directed to output fiber 164H. Similarly, micro-mirror 202 directs optical signal 168E to output fiber 164G. The extensions 204, 206, 208 do not interfere with the optical signal 168E along its path from the mirror 202 to the output fiber 164G.

The rotating micro-mirrors 170 in the array have the advantage that they can redirect the optical signals 168 by rotating only 45 degrees. This small angle of rotation increases switching speed and reduces wear and tear on the optical switch 160.

In an alternate embodiment, the switch 160 can be converted to an N×(N+1) optical switch by adding a secondary set of output optical fibers 210A–210H (collectively "210"). By locating all of the rotating micro-mirrors in the neutral position, the optical signals 168A–168H will be transmitted directly from the input fibers 162A–162H through the free-space 169 to the secondary array of output fibers 210A–210H, respectively.

Figure 9:
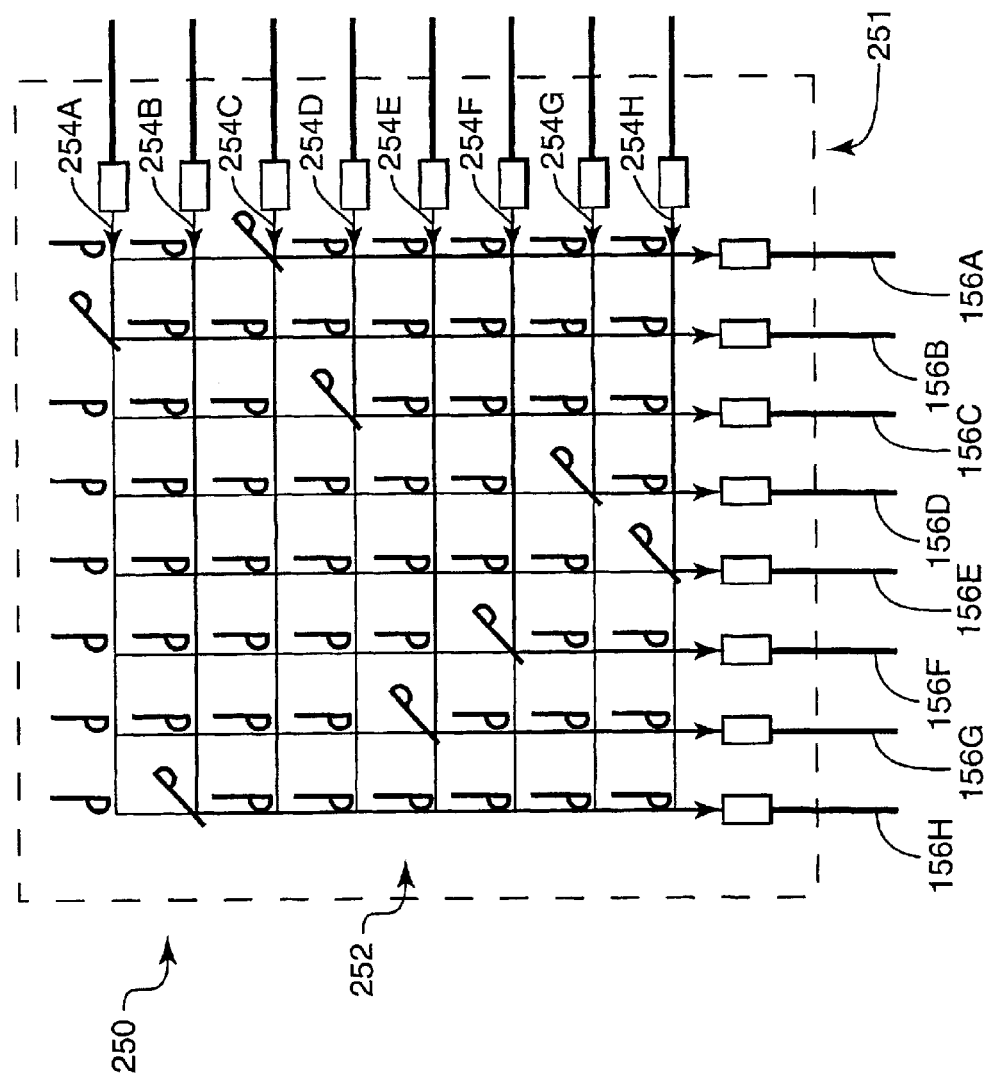
FIG. 9 is a schematic illustration of an alternate N×N optical switch in accordance with the present invention.

FIG. 9 is a schematic illustration of an optical switch 250 in accordance with the present invention. The array of rotating micro-mirrors 252 constructed on the surface of a substrate 251 correspond generally to the embodiment illustrated in FIGS. 2 and 3. By rotating any of the micro-mirrors 252 about 135 degrees, the optical signals 254A–254H can be directed to any of the output fibers 256A–256H. The optical switch 250 of FIG. 9 may also include a secondary array of output optical fibers directly opposite the input fibers 258A–258H for receiving the optical signals 254A–254H when the micro-mirrors 252 are in the neutral position (see FIG. 8).

All of the patents and patent applications disclosed herein, including those set forth in the Background of the Invention, are hereby incorporated by reference. Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

What is claimed is:

1. An optical switch based on a rotating vertical micro-mirror constructed on a surface of a substrate, comprising:
   at least one input optical fiber arranged to direct at least one optical signal through a free-space along a first optical path parallel to the surface of the substrate;
   a plurality of output optical fibers arranged to receive the optical signal traveling through the free-space, at least one of the output optical fibers comprising an optical path not co-linear with the first optical path; and
   at least one substantially vertical, rotating micro-mirror assembly located in the free-space comprising a rotating micro-mirror with a vertical centerline and an axis of rotation both perpendicular to the surface, but not co-linear, the rotating micro-mirror being rotatable between at least one first position not in the first optical path and at least one second position in the first optical path to redirect the optical signal to one of the output optical fibers, wherein the rotating micro-mirror assembly comprises a linkage mechanism mechanically coupled to a plurality of thermal actuators.

2. The optical switch of claim 1 comprising a plurality of input optical fibers.

3. The optical switch of claim 1 wherein the plurality of output optical fibers are generally arranged around the rotating micro-mirror assembly wherein the second position comprises a plurality of positions each adapted to direct the optical signal to one of the output optical fibers.

4. The optical switch of claim 1 wherein the plurality of output optical fibers are generally arranged perpendicular to the first optical path comprising a rotating micro-mirror assembly adjacent to the first optical path, but opposite each of the output optical fibers to selectively redirect the optical signal to any of the output optical fibers.

5. The optical switch of claim 1 comprising:
   a plurality of input optical fibers each arranged to direct an optical signal through the free-space; and
   an array of rotating micro-mirror assemblies constructed on the substrate arranged to direct the discrete optical signals from any of the plurality of input optical fibers to any of the output optical fibers.

6. The optical switch of claim 5 comprising a secondary array of output optical fibers arranged to receive the optical signals from one or more of the input optical fibers when the rotating micro-mirrors are in the first position.

7. The optical switch of claim 6 wherein one of the optical fibers in the secondary array are co-linear with each of the input optical fibers.

8. The optical switch of claim 1 wherein the input optical fiber is arranged generally perpendicular to each of the output optical fibers.

9. The optical switch of claim 1 wherein the rotating micro-mirror rotates about 45 degrees between the first position and the second position.

10. The optical switch of claim 1 wherein the rotating micro-mirror rotates about 135 degrees between the first position and the second position.

11. The optical switch of claim 1 comprising a gap between the axis of rotation and the rotating micro-mirror.

12. The optical switch of claim 1 comprising a gap between the axis of rotation and the rotating micro-mirror through which the optical signal can pass without engaging the micro-mirror.

13. The optical switch of claim 1 comprising a gap between the axis of rotation and the rotating micro-mirror through which the optical signal can pass when the micro-mirror is in the first position.

14. An optical communication system including at least one optical switch in accordance with claim 1.

15. An optical switch comprising:

a plurality of input optical fibers each arranged to direct optical signals through a free-space along a plurality of input optical paths parallel to the surface of the substrate;

a plurality of output optical fibers not co-linear with the input optical paths and arranged to receive one of the optical signals traveling through free-space; and a plurality of substantially vertical, rotating micro-mirror assemblies constructed on a surface of a substrate each comprising a rotating micro-mirror with a vertical centerline and an axis of rotation both perpendicular to the surface, but not co-linear, the rotating micro-mirrors being rotatable between a first position not in the input optical paths and at least a second position in one of the optical paths to redirect one of the optical signals to one of the output optical fibers, wherein the rotating micro-mirror assemblies comprise a linkage mechanism mechanically coupled to a plurality of thermal actuators.

* * * * *